(12) United States Patent
van Doorn

(10) Patent No.: US 6,379,053 B1
(45) Date of Patent: Apr. 30, 2002

(54) MULTI-FIBER FIBER OPTIC CONNECTORS

(75) Inventor: Schelto van Doorn, San Jose, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/584,904

(22) Filed: May 30, 2000

(51) Int. Cl.[7] ............................................. G02B 6/38
(52) U.S. Cl. ........................................ 385/59; 385/58
(58) Field of Search .............................. 385/59, 54, 55, 385/58, 62, 65, 70, 71

(56) References Cited

U.S. PATENT DOCUMENTS

| | | | |
|---|---|---|---|
| 4,277,272 A | | 7/1981 | Schneider |
| 4,312,564 A | * | 1/1982 | Cefarelli et al. .......... 350/96.22 |
| 4,943,136 A | * | 7/1990 | Popoff ..................... 350/96.16 |
| 4,979,787 A | | 12/1990 | Lichtenberger |
| 5,112,262 A | | 5/1992 | Obata et al. |
| 5,165,002 A | | 11/1992 | Cumberledge et al. |
| 5,214,730 A | | 5/1993 | Nagasawa et al. |
| 5,223,965 A | | 6/1993 | Ota et al. |
| 5,233,676 A | | 8/1993 | Yonemura et al. |
| 5,233,677 A | | 8/1993 | Winslow |
| 5,325,455 A | | 6/1994 | Henson et al. |
| 5,428,190 A | | 6/1995 | Stopperan |
| 5,627,405 A | | 5/1997 | Chillara |
| 5,769,996 A | | 6/1998 | McArdle et al. |
| 5,770,305 A | | 6/1998 | Terasaka |
| 5,851,644 A | | 12/1998 | McArdle et al. |
| 5,864,468 A | | 1/1999 | Poplawski et al. |
| 5,966,489 A | | 10/1999 | Harwell et al. |

* cited by examiner

Primary Examiner—Brian Sircus
Assistant Examiner—Chandrika Prasad
(74) Attorney, Agent, or Firm—Fish & Richardson P.C.

(57) ABSTRACT

Multi-fiber fiber optic connectors (22–26, 40) are described. The fiber optic connectors (22–26) enable direct board-to-board optical communication but do not require data transmission through a backplane (12). In one aspect, a fiber optic connector (40) includes a plurality of optical fibers (42) terminating at proximal and distal ends, and a flexible support (44) configured to hold the optical fibers (42) in an elongated spaced-apart three-dimensional array characterized by insignificant optical coupling between the optical fibers (42). The support (44) has a proximal end terminating at a proximal end face (46) at which the proximal ends of the optical fibers (42) terminate. The proximal end face (46) of the support (44) is sized and arranged to contact a port (88, 90, 112, 114, 134, 136, 164, 166) of an optical device (68, 102, 128, 158) whereupon one or more of the optical fibers (42) couple to the optical device (68, 102, 128, 158) through the port (88, 90, 112, 114, 134, 136, 164, 166). In another aspect, a fiber optic connector (40) includes a plurality of optical fibers (42) formed from a core material with a characteristic refractive index. The optical fibers (42) are embedded in an elongated integral support (44) formed from a flexible cladding material with refractive index that is lower than the refractive index of the core material.

32 Claims, 3 Drawing Sheets

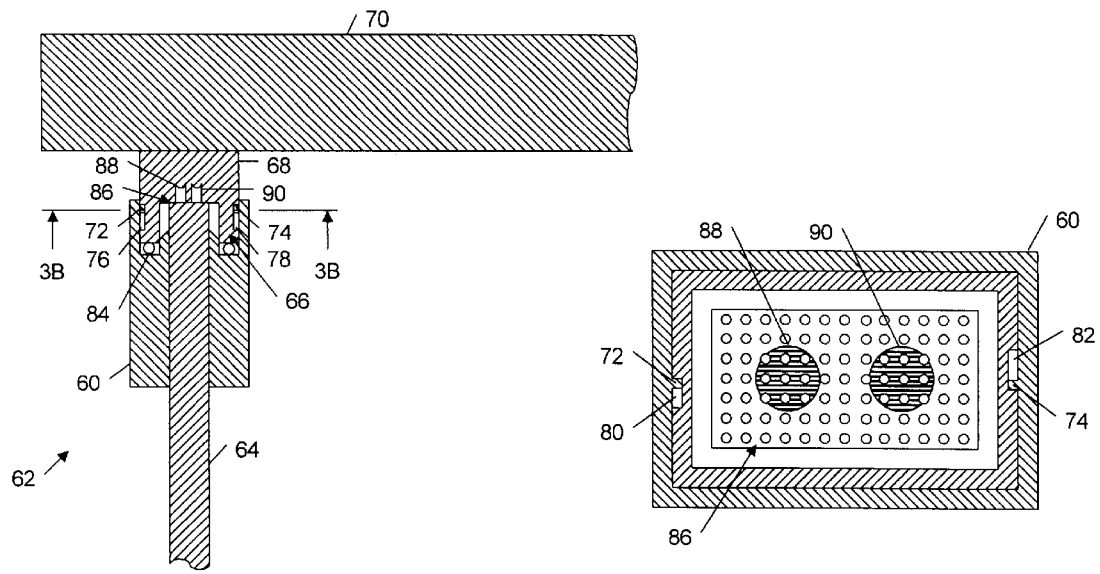
FIG. 3A
FIG. 3B
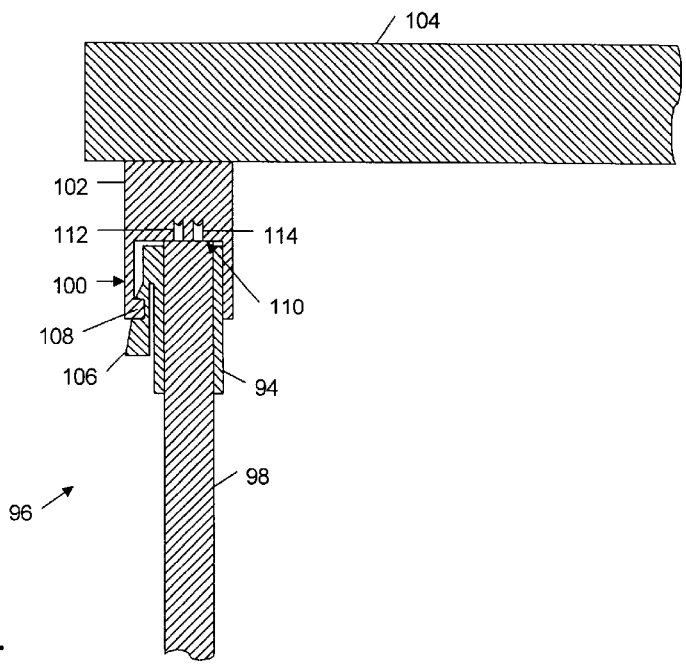
FIG. 4

MULTI-FIBER FIBER OPTIC CONNECTORS

TECHNICAL FIELD

This invention relates to multi-fiber fiber optic connectors.

BACKGROUND

Fiber optic connectors couple optical communication channels (e.g., optical fibers) to one or more optical devices (e.g., electro-optic and opto-electric devices). The optical communication channels may be defined by a bundle of glass or plastic fibers (a "fiber optic cable"), each of which is capable of transmitting data independently of the other fibers. Relative to traditional metal connections, optical fibers have a much greater bandwidth, they are less susceptible to interference, and they are much thinner and lighter. Because of these advantageous physical and data transmission properties, efforts have been made to integrate fiber optics into computer system designs. For example, in a local area network, fiber optics may be used to connect a plurality of local computers to centralized equipment, such as servers and printers. In this arrangement, each local computer has an optical transceiver for transmitting and receiving optical information. The optical transceiver may be mounted on a printed circuit board that supports one or more integrated circuits. Typically, each computer includes several printed circuit boards that are plugged into the sockets of a common backplane. The backplane may be active (i.e., it includes logic circuitry for performing computing functions) or it may be passive (i.e., it does not include any logic circuitry). An external network fiber optic cable may be connected to the optical transceiver through a fiber optic connector that is coupled to the backplane.

Other fiber optic applications have been proposed. For example, backplanes have been designed to interconnect the circuit boards of a computer system and thereby enable optical communication between the boards (see, e.g., U.S. Pat. Nos. 4,913,508, 5,134,679, and 5,793,919). These backplanes often are referred to as "optical backplanes." Typically, an optical backplane includes one or more fiber optic cables that couple to connectors mounted on the edges of the printed circuit boards.

SUMMARY

The invention features a flexible multi-fiber fiber optic connector that enables direct board-to-board optical communication but does not require data transmission through the backplane.

In one aspect, the invention features a multi-fiber fiber optic connector that includes a plurality of optical fibers terminating at proximal and distal ends, and a flexible support configured to hold the optical fibers in an elongated spaced-apart three-dimensional array. The support has a proximal end terminating at a proximal end face at which the proximal ends of the optical fibers terminate. The proximal end face of the support is sized and arranged to contact a port of an optical device whereupon one or more of the optical fibers couple to the optical device through the port.

As used herein, the term "optical device port" is intended to broadly refer to an interface where one or more optical fibers may optically couple to an optical device. This interface may include an optical lens, or it may include a portion of a light-sensing or light-transmitting surface of the optical device. Also, the term "optical fibers" is intended to refer to the material substance defining a single optical channel in the multi-fiber fiber optic connector. The optical channel may be defined by a single material (e.g., a single core material) or a composite material (e.g., a core material surrounded by an optical or non-optical material).

Furthermore, as used herein the language "terminating at" means terminating adjacent to or just beyond.

In another aspect, the invention features a multi-fiber fiber optic connector that includes a plurality of optical fibers formed from a core material with a refractive index. The optical fibers are embedded in an elongated integral support formed from a flexible cladding material with refractive index that is different from the refractive index of the core material. The support is configured to hold the optical fibers in a spaced-apart three-dimensional array characterized by insignificant optical coupling between the optical fibers.

Embodiments may include one or more of the following features.

The support preferably is configured to hold the optical fibers in a substantially parallel three-dimensional array. The optical fiber spacing along a particular line preferably is less than a characteristic dimension of the optical device port along the same line. The optical fiber spacing may be less than one-half of the characteristic dimension of the optical device port. The optical fiber spacing may be between about 10 $\mu$m and about 250 $\mu$m, and preferably is between about 50 $\mu$m and about 125 $\mu$m. The optical fiber spacing may be such that two or more optical fibers couple to the optical device upon contact between the proximal end face of the support and the optical device port.

The proximal end face of the support preferably is sized and arranged to overlay the optical device port. The proximal end face of the support may be sized to overlay two or more ports of a multi-port optical device (e.g., a transmitter and a receiver of an optical transceiver).

The optical fibers and the support preferably form a unitary flexible fiber optic cable. The optical fiber cores preferably are embedded in the cladding material of the support such that light injected into an optical fiber core travels through that core with insubstantial loss. The cladding material may include silicone.

The multi-fiber fiber optic connector may include a proximal terminal coupled to the proximal end of the support. The proximal terminal may be configured to position the proximal end face of the support against the optical device port. The proximal terminal may include a socket configured to receive a plug of the optical device, or a plug configured to be inserted into a socket of the optical device. The proximal terminal may be formed from a flexible material and may be sized and arranged to engage the optical device with a friction fit; the flexible terminal material may be formed integrally with the flexible support. The proximal terminal may include a biasing mechanism for urging the proximal end face of the support against the optical device port.

The support preferably includes a distal end face at which the distal ends of the optical fibers terminate. The distal end face may be sized and arranged to contact a port of a second optical device. The proximal and distal end faces of the support may be configured to optically couple one or more of the optical fibers to each of a pair of opposed optical devices coupled to facing sides of adjacent printed circuit boards connected to a common backplane.

Among the advantages of the invention are the following. The invention enables direct board-to-board optical communication without requiring data transmission through the backplane. Furthermore, the fiber spacing is such that at least one optical fiber couples to an optical device upon contact between the support end face and the optical device port. Thus, the inventive fiber optic connector may couple to an optical device without requiring complex and precise alignment mechanisms between the optical device and the fiber optic connector.

Other features and advantages of the invention will become apparent from the following description, including the drawings and the claims.

DESCRIPTION OF DRAWINGS

FIG. 3A is an enlarged diagrammatic cross-sectional side view of a flexible multi-fiber fiber optic connector with a terminal socket coupled to a plug of an optical device mounted on a printed circuit board.

FIG. 3B is an enlarged diagrammatic cross-sectional front view of the interface between the multi-fiber fiber optic connector and two ports of the optical device of FIG. 3A, taken along the line 3B—3B.

FIG. 4 is a diagrammatic cross-sectional side view of a flexible multi-fiber fiber optic connector with a terminal plug inserted into a socket of an optical device mounted on a printed circuit board.

DETAILED DESCRIPTION

Figure 1:
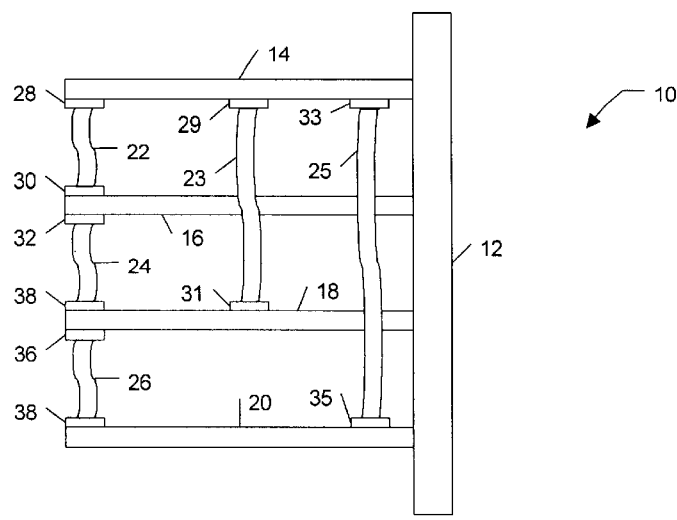
FIG. 1 is a diagrammatic side view of a computer system that includes a backplane and four printed circuit boards coupled by respective flexible multi-fiber fiber optic connectors.

Referring to FIG. 1, a computer system 10 includes a backplane 12 into which printed circuit boards 14, 16, 18 and 20 are plugged. Flexible multi-fiber fiber optic connectors 22, 23, 24, 25 and 26 optically couple printed circuit boards 14–20. Each of the printed circuit boards 14–20 supports one or more integrated circuits and at least one optical device 28, 29, 30, 31, 32, 33, 34, 35, 36, 38 (e.g., a fiber optic transceiver) for transmitting and receiving optical data signals over multi-fiber fiber optic connectors 22–26. Each of the fiber optic connectors 22–26 includes a plurality of optical fibers with proximal and distal ends respectively terminating at proximal and distal end faces of a flexible support. In this embodiment, the proximal and distal end faces of the support are configured to optically couple one or more optical fibers to each of a pair of opposed optical devices coupled to facing sides of adjacent printed circuit boards. By this arrangement, multi-fiber fiber optic connectors 22–26 enable direct board-to-board optical communication without requiring data transmission through backplane 12.

The components (e.g., the integrated circuits and the optical devices) supported on printed circuit boards 14–20 may be housed in ball grid array (BGA) packages that include die carriers with bottom surfaces supporting a plurality of solder balls (or bumps) that connect to contacts on the surfaces of printed circuit boards 14–20. The BGA packages may include over molded pad array carriers or ceramic substrates that house the printed circuit board components. In alternative embodiments, the printed circuit board components may be mounted to the printed circuit boards using surface mount technology (SMT) or other mounting technique (e.g., bore soldering technology). In other embodiments, the integrated circuits and optical devices may be mounted on single-sided printed circuit boards rather than two-sided printed circuit boards 14–20.

Figure 2A:
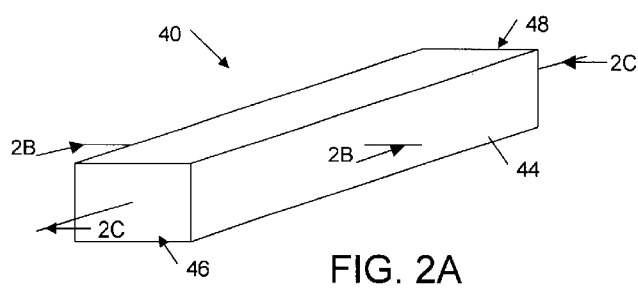
FIG. 2A is a diagrammatic perspective view of a flexible multi-fiber fiber optic connector.
Figure 2B:
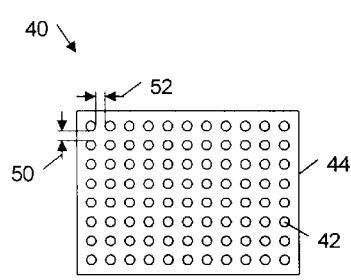
FIG. 2B is a diagrammatic cross-sectional front view of the multi-fiber fiber optic connector of FIG. 2A.
Figure 2C:
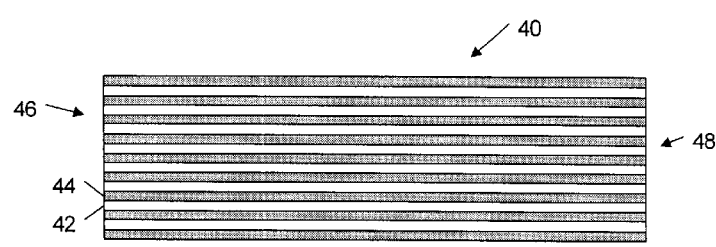
FIG. 2C is a diagrammatic cross-sectional side view of the multi-fiber fiber optic connector of FIG. 2A.

Referring to FIGS. 2A–2C, in one embodiment, a multi-fiber fiber optic connector 40 includes a plurality of optical fibers 42 embedded in an elongated integral support 44 that holds optical fibers 42 in a spaced-apart, substantially parallel three-dimensional array. Support 44 has a proximal end face 46 and a distal end face 48 at which the proximal and distal ends of optical fibers 42 respectively terminate. Optical fibers 42 may terminate adjacent to proximal end face 46. Alternatively, optical fibers 42 may terminate just beyond proximal end face 46; the optical fibers preferably do not project out of end face 46 by a distance that is greater than the diameter of optical fibers 42. Optical fibers 42 are formed from a core material with a characteristic refractive index ($n_1$), and support 44 is formed from a flexible cladding material with a refractive index ($n_2$) that is different from the refractive index ($n_1$) of the optical fiber core material. In one embodiment, the refractive indices of optical fibers 42 and support 44 satisfy the following condition:

$|n_1-n_2|\geq 0.01$

In another embodiment, support 44 is formed from a non-optical material that is substantially opaque with respect to the light injected into optical fibers 42.

By the above-described design, light injected into one of the optical fiber cores preferentially travels through that core with insubstantial loss. That is, the support material and the optical fiber spacing are selected so that there is insignificant coupling between the optical fibers. Optical fibers 42 may be formed from silica, glass, or plastic. Support 44 may be formed from a flexible polymer, for example, a silicone-based material such as silicone rubber. A protective layer also may be formed around fiber optic connector. Such a protective layer may be formed from, for example, a thermoplastic material such as polyvinyl chloride (PVC) or an acrylate material.

The spacing between optical fibers 42 along a particular line is less than a characteristic dimension of a port of an optical device to which fiber optic connector 40 is to be coupled along the same line. In particular, the optical fiber spacing is selected so that one or more optical fibers 42 couple to the optical device upon connection of a support end face 46, 48 to the optical device port. Thus, the characteristic dimension of the optical device port is a measure in one direction of the physical interface through which one or more optical fibers may couple to the optical device. In one embodiment, the optical fiber spacing is less than one-half of the characteristic dimension of the optical device port. In this embodiment, two or more optical fibers may simultaneously couple to the optical device upon connection of support 44 to the optical device port. In preferred embodiments, optical fibers 42 are about 50 μm in diameter, and the optical fiber spacing is between about 10 μm and about 250 μm, and more preferably between about 50 μm and about 125 μm. In general, the vertical spacing 50 between adjacent optical fibers is approximately the same as the horizontal spacing 52; in some embodiments, however, the vertical spacing 50 and the horizontal spacing 52 may be different.

Certain optical devices have two or more optical coupling ports (e.g., a fiber optic transceiver typically has an optical transmitter port and an optical receiver port). In some embodiments, each support end face 46, 48 is sized and arranged to contact and overlay two or more ports of an optical device, such as a fiber optic transceiver, so that one or more optical fibers may couple to each of the ports of the multi-port optical device.

Fiber optic connector 40 is sufficiently flexible that it can be deformed elastically to accommodate a difference between the length of the fiber optic connector and the spacing between a pair of opposed optical devices. At the same time, fiber optic connector 40 is sufficiently resilient that it generates an outward restoring force that tends to return fiber optic connector 40 back to its original shape. This restoring force causes fiber optic connector 40 to urge the ends of optical fibers 42 against the ports of the opposed optical devices. Additional materials may be incorporated into support 44 to increase the resiliency of fiber optic connector 40. For example, one or more resilient wires formed from, for example, metal or plastic, may be embedded along the length of support 44 to increase the restoring force generated by fiber optic connector 40.

Referring back to FIG. 1, in operation, a technician may attach one end of fiber optic connector 40 to one of a pair of opposed optical devices. Subsequently, the technician may apply a compressive force between the ends of fiber optic connector 40 to cause it to deform elastically to accommodate the spacing between the opposed optical devices and allow the technician to connect the other end of fiber optic connector 40 to the second optical device. After fiber optic connector 40 has been coupled between the pair of opposed optical devices, the adjacent printed circuit boards to which the opposed optical devices respectively are mounted apply a compressive load to fiber optic connector 40. This compressive load is balanced by an outward restoring force generated by fiber optic connector 40 that urges connector end faces 46, 48 against the ports of the opposed optical devices.

As explained in detail below, fiber optic connector 40 may include proximal and distal terminals configured to position the proximal and distal end faces of fiber optic connector 40 against one or more optical device ports. The terminals may be formed from a separate plug or socket, or the ends of fiber optic connector 40 may be formed into an integral plug or socket that is configured to couple to an optical device port with a friction fit.

Referring to FIGS. 3A and 3B, in one embodiment, a socket (or receptacle) 60 is coupled to a proximal end 62 of a fiber optic connector 64. Socket 60 is configured to receive a mating plug 66 of an optical device 68, which is mounted on a printed circuit board 70. Socket 60 has a pair of pins 72, 74 that are slidable within vertical slots 76, 78 of plug 66. Socket 60 may be slid over plug 66, with pins 72, 74 aligned with vertical slots 76, 78, until pins 72, 74 reach the ends of vertical slots 76, 78. Socket 60 then may be rotated to seat pins 72, 74 in horizontal extensions 80, 82 of vertical slots 76, 78. The process of seating pins 72, 74 within extensions 80, 82 compresses a biasing mechanism 84 (e.g., a rubber o-ring) that urges socket 60 against plug 66, effectively locking fiber optic connector 64 to optical device 68. In an alternative embodiment, socket 60 is rotatable about fiber optic connector 64 and mates with plug 66 through a threaded screw-type connection.

As shown in FIG. 3B, when socket 60 is engaged with plug 64, a proximal end face 86 of fiber optic connector 64 is urged against a pair of ports 88, 90 of optical device 68. End face 86 is sized and arranged to contact and overlay both optical device ports 88, 90 so that one or more optical fibers 92 optically couple to each port 88, 90. In this embodiment, nine optical fibers 92 optically couple to each of the optical device ports 88, 90.

Referring to FIG. 4, in another embodiment, a plug 94 is coupled to a proximal end 96 of a fiber optic connector 98. Plug 94 is insertable into a mating socket 100 of an optical device 102, which is mounted on a printed circuit board 104. Plug 94 includes a latch 106 that catches on a lug 108 of socket 100 to lock fiber optic connector 98 to optical device 102. When plug 94 is engaged with socket 100, a proximal end face 110 of fiber optic connector 98 is urged against a pair of ports 112, 114 of optical device 102. End face 110 is sized and arranged to contact and overlay both optical device ports 112, 114 so that one or more optical fibers optically couple to each port 112, 114. Latch 106 may be depressed to release fiber optic connector 98 from optical device 102.

Figure 5:
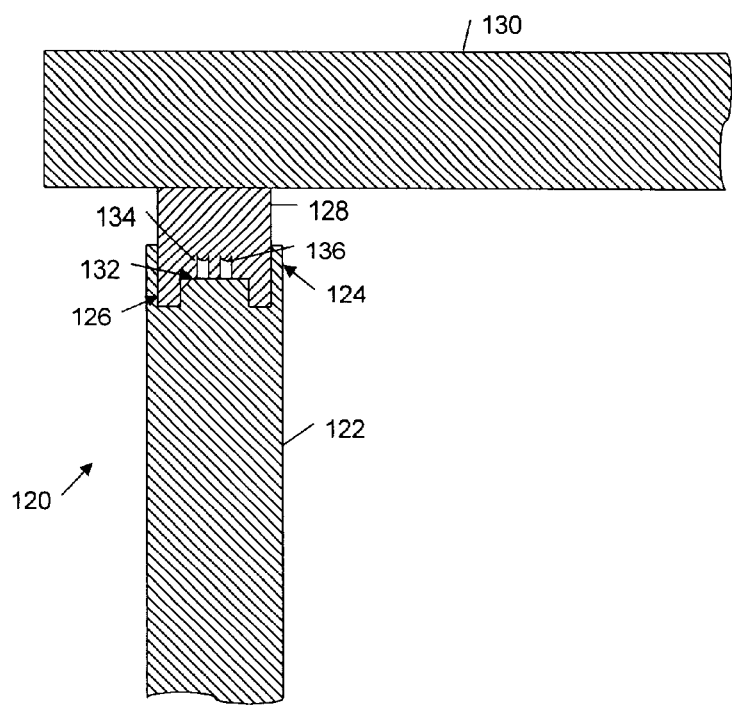
FIG. 5 is a diagrammatic cross-sectional side view of a plug of an optical device inserted with a friction fit into an integral terminal socket of a flexible multi-fiber fiber optic connector.

Referring to FIG. 5, in another embodiment, an end 120 of a fiber optic connector 122 is formed into an integral socket 124. Socket 124 is configured to receive a mating plug 126 of an optical device 128, which is mounted on a printed circuit board 130. Socket 124 engages plug 126 with a friction fit so that a proximal end face 132 of fiber optic connector 122 is urged against a pair of ports 134, 136 of optical device 128. End face 132 is sized and arranged to contact and overlay both optical device ports 134, 136 so that one or more optical fibers optically couple to each port 134, 136.

Figure 6:
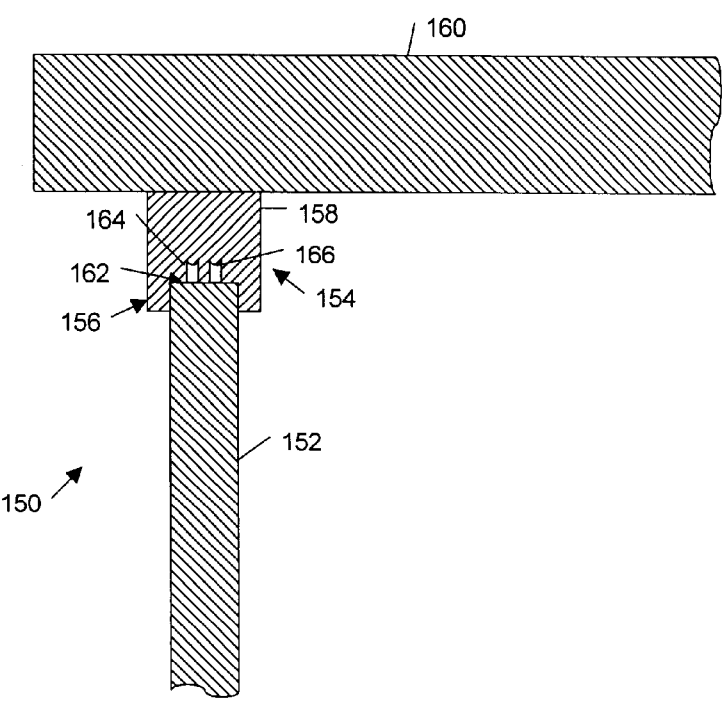
FIG. 6 is a diagrammatic cross-sectional side view of an integral terminal plug of a flexible multi-fiber fiber optic connector inserted with a friction fit into a socket of an optical device.

Referring to FIG. 6, in another embodiment, an end 150 of a fiber optic connector 152 is formed into an integral plug 154. Plug 154 is insertable into a mating socket 156 of an optical device 158, which is mounted to a printed circuit board 160. Plug 154 engages socket 156 with a friction fit so that a proximal end face 162 of fiber optic connector 152 is urged against a pair of ports 164, 166 of optical device 138. End face 162 is sized and arranged to contact and overlay both optical device ports 164, 166 so that one or more optical fibers optically couple to each port 164, 166.

Other embodiments are within the scope of the claims. For example, the optical fibers may include an intermediate cladding layer surrounding the central fiber core. The intermediate cladding layer may be sufficient to confine light injected into the optical fiber cores, in which case the support need not be formed from a material with a lower refractive index than the optical fiber core material. The optical fibers also may include one or more non-optical layers (e.g., a protective layer formed around the optical core).

What is claimed is:

1. A multi-fiber fiber optic connector, comprising:
   a plurality of optical fibers terminating at proximal and distal ends, and
   a flexible resilient support extending between a first optical device and a second optical device, the support having an original shape and having a proximal end with a proximal face and a distal end with a distal face at which the proximal and distal ends of the optical fibers terminate respectively, the proximal and distal faces being sized and arranged to contact a port of the first and the second optical device, respectively, to couple one or more of the optical fibers to the optical device through the port, the flexible resilient support holding the optical fibers in a spaced-apart three-dimensional array between the proximal and the distal end faces and having a resilient force to urge the connector to return to the original shape.

2. The multi-fiber fiber optic connector of claim 1, wherein the support is configured to hold the optical fibers in an elongated substantially parallel three-dimensional array.

3. The multi-fiber fiber optic connector of claim 1, wherein the optical fiber spacing along a particular line is less than a characteristic dimension of the optical device port along the same line.

4. The multi-fiber fiber optic connector of claim 3, wherein optical fiber spacing is less than one-half of the characteristic dimension of the optical device port.

5. The multi-fiber fiber optic connector of claim 1, wherein the optical fiber spacing is between about 10 $\mu$m and about 250 $\mu$m.

6. The multi-fiber fiber optic connector of claim 1, wherein the optical fiber spacing is between about 50 $\mu$m and about 125 $\mu$m.

7. The multi-fiber fiber optic connector of claim 1, wherein the optical fiber spacing is such that two or more optical fibers couple to the optical device upon contact between the proximal end face of the support and the optical device port.

8. The multi-fiber fiber optic connector of claim 1, wherein there is insignificant optical coupling between the optical fibers.

9. The multi-fiber fiber optic connector of claim 1, wherein the proximal end face and the distal end face of the support are sized and arranged to overlay the optical device port.

10. The multi-fiber fiber optic connector of claim 1, wherein the proximal end face and the distal end face of the support are sized to overlay two or more ports of a multi-port optical device.

11. The multi-fiber fiber optic connector of claim 1, wherein the proximal end face and the distal end face of the support are sized to simultaneously couple to a transmitter and a receiver of an optical device.

12. The multi-fiber fiber optic connector of claim 1, wherein the proximal end face and the distal end face of the support are sized and arranged to simultaneously couple to two or more optical devices.

13. The multi-fiber fiber optic connector of claim 1, wherein the optical fibers and the support form a unitary flexible fiber optic cable.

14. The multi-fiber fiber optic connector of claim 13, wherein each of the optical fibers is formed from a core material with a characteristic a refractive index, and the support is formed from a cladding material with a refractive index that is lower than the refractive index of the core material.

15. The multi-fiber fiber optic connector of claim 14, wherein the optical fiber cores are embedded in the cladding material of the support such that light injected into an optical fiber core travels through that core with insubstantial loss.

16. The multi-fiber fiber optic connector of claim 14, wherein the cladding material comprises silicone and wherein the cladding material is sufficiently resilient to return the fiber optic connector to the original shape.

17. The multi-fiber fiber optic connector of claim 1, wherein one or more of the optical fibers terminate just beyond the proximal and the distal ends of the support.

18. The multi-fiber fiber optic connector of claim 1, further comprising a terminal coupled to at least one of the proximal and the distal end of the support and configured to position at least one of the proximal and the distal end face of the support against the optical device port, wherein the resilience of the flexible support urges at least one of the proximal and distal terminals against the optical device port.

19. The multi-fiber fiber optic connector of claim 18, wherein the terminal comprises a socket configured to receive a plug of the optical device.

20. The multi-fiber fiber optic connector of claim 18, wherein the terminal comprises a plug configured to be inserted into a socket of the optical device.

21. The multi-fiber fiber optic connector of claim 18, wherein the terminal is formed from a flexible material and is sized and arranged to engage the optical device with a friction fit.

22. The multi-fiber fiber optic connector of claim 21, wherein the flexible terminal material is formed integrally with the flexible support.

23. The multi-fiber fiber optic connector of claim 18, wherein the terminal includes a biasing mechanism for urging the proximal end face of the support against the optical device port.

24. The multi-fiber fiber optic connector of claim 1, wherein the proximal and distal end faces of the support are configured to optically couple one or more of the optical fibers to each of a pair of opposed optical devices coupled to facing sides of adjacent printed circuit boards connected to a common backplane.

25. A multi-fiber fiber optic connector, comprising: a plurality of optical fibers formed from a core material with a refractive index and embedded in an elongated integral flexible resilient support formed from a flexible cladding material with refractive index that is different from the refractive index of the core material, the flexible resilient support extending between the proximal and the distal end faces and holding the optical fibers in a spaced-apart three-dimensional array characterized by insignificant optical coupling between the optical fibers, the support configured to have a resilient force to urge the connector to return to the original shape.

26. The multi-fiber fiber optic connector of claim 25, wherein the support is configured to hold the optical fibers in a substantially parallel three-dimensional array.

27. The multi-fiber fiber optic connector of claim 25, wherein the optical fiber spacing along a particular line is less than a characteristic dimension of a port of an optical device along the same line.

28. The multi-fiber fiber optic connector of claim 25, wherein optical fiber spacing is less than one-half of the characteristic dimension of the optical device port.

29. The multi-fiber fiber optic connector of claim 25, wherein the optical fiber spacing is between about 10 $\mu$m and about 250 $\mu$m.

30. The multi-fiber fiber optic connector of claim 25, wherein the optical fiber spacing is between about 50 $\mu$m and about 125 $\mu$m.

31. The multi-fiber fiber optic connector of claim 16, wherein the cladding material includes material that has resiliency higher than silicone.

32. The multi-fiber fiber optic connector of claim 31, wherein the material that has resiliency higher than silicone in embedded along the length of the fiber optic connector.

* * * * *

UNITED STATES PATENT AND TRADEMARK OFFICE
CERTIFICATE OF CORRECTION

PATENT NO. : 6,379,053 B1
DATED : April 30, 2002
INVENTOR(S) : Schelto Van Doorn It is certified that error appears in the above-identified patent and that said Letters Patent is hereby corrected as shown below:

<u>Column 4,</u>
Line 22, replace "Alternatively, optical fibers. 42 may terminate just beyond" with
-- Alternatively, optical fibers 42 may terminate just beyond --
Line 33, replace "$|n_1-n_2| \geqq 0.01$" with -- $| n_1-n_2 | \geq 0.01$ --

Signed and Sealed this

Fifth Day of August, 2003

JAMES E. ROGAN
*Director of the United States Patent and Trademark Office*